US012747623B2

(12) United States Patent
Kessler et al.

(10) Patent No.: US 12,747,623 B2
(45) Date of Patent: Sep. 29, 2026

(54) METHOD FOR OPERATING A MOTOR-ACTUATABLE TAILGATE OF A MOTOR VEHICLE

(71) Applicant: Conti Temic microelectronic GmbH, Ingolstadt (DE)

(72) Inventors: Erwin Kessler, Saulgau (DE); Beat Bauer, Friedrichshafen (DE)

(73) Assignee: AUMOVIO Germany GmbH, Frankfurt am Main (DE)

( * ) Notice: Subject to any disclaimer, the term of this patent is extended or adjusted under 35 U.S.C. 154(b) by 40 days.

(21) Appl. No.: 18/853,937

(22) PCT Filed: Mar. 29, 2023

(86) PCT No.: PCT/DE2023/200069

§ 371 (c)(1),
(2) Date: Oct. 3, 2024

(87) PCT Pub. No.: WO2023/193853

PCT Pub. Date: Oct. 12, 2023

(65) Prior Publication Data

US 2025/0223859 A1 Jul. 10, 2025

(30) Foreign Application Priority Data

Apr. 6, 2022 (DE) ..................... 10 2022 203 448.1

(51) Int. Cl.
*E05F 15/70* (2015.01)

(52) U.S. Cl.
CPC ......... *E05F 15/70* (2015.01); *E05Y 2201/418* (2013.01); *E05Y 2400/3013* (2024.05); *E05Y 2400/31* (2013.01); *E05Y 2400/35* (2013.01); *E05Y 2400/36* (2013.01)

(58) Field of Classification Search
CPC .. E05F 15/70; E05Y 2400/36; E05Y 2400/35; E05Y 2400/31; E05Y 2201/418; E05Y 2400/3013
USPC ........................................................... 701/49
See application file for complete search history.

(56) References Cited

U.S. PATENT DOCUMENTS

| | | | | |
|---|---|---|---|---|
| 10,407,024 | B2 * | 9/2019 | Müller | G07C 9/00309 |
| 2008/0049150 | A1 * | 2/2008 | Herbin | G08G 1/166 348/744 |
| 2014/0207344 | A1 * | 7/2014 | Ihlenburg | E05F 15/73 701/49 |
| 2016/0026191 | A1 * | 1/2016 | Fujimoto | H02P 31/00 701/49 |
| 2020/0177177 | A1 * | 6/2020 | Kessler | H03K 17/0822 |
| 2022/0316259 | A1 * | 10/2022 | Pulikonda | H02P 3/12 |
| 2023/0016676 | A1 * | 1/2023 | Salter | E05F 15/40 |

FOREIGN PATENT DOCUMENTS

| | | | |
|---|---|---|---|
| DE | 102010048758 | A1 | 4/2012 |
| DE | 102017214381 | B3 | 5/2018 |
| DE | 112017005421 | T5 | 10/2019 |

OTHER PUBLICATIONS

Office Action dated Jan. 18, 2023 from corresponding German patent application No. 10 2022 203 448.1.
International Search Report and Written Opinion dated Jul. 11, 2023 from corresponding International patent application No. PCT/DE2023/200069.
Office Action dated Jul. 11, 2025 from corresponding German patent application No. 10 2022 203 448.1.

* cited by examiner

*Primary Examiner* — Yazan A Soofi

(57) ABSTRACT

In a method for operating a motor-actuatable tailgate of a motor vehicle, the motor of which can be activated or deactivated controlledly by actuation of an actuating element of an operating element, a control unit ascertains whether the actuating element is actuated for a predetermined period of time or by a predetermined actuation sequence and at the same time a manual closing movement of the tailgate is effected. If so, a holding mode is activated on reaching the tailgate position at which the actuating element is no longer actuated, wherein the motor is short-circuited in the holding mode.

20 Claims, No Drawings

METHOD FOR OPERATING A MOTOR-ACTUATABLE TAILGATE OF A MOTOR VEHICLE

In motor vehicles, in particular in passenger cars, bulky objects are often also transported in the luggage compartment. If there is not enough space in the luggage compartment, as can be the case for example for a bicycle or wooden slats, manual tailgates have been and are closed as far as possible and secured against reopening by bicycle cords, ties or the like.

In modern vehicles, however, handles or eyes on the tailgates are increasingly absent, and therefore only the tailgate lock remains available as a fastening point for such fastening means. Pressing the lock shut is then risky, however, owing to the attached closing aids; there may no longer be any protection against jamming. Since modern door locks, in particular the tailgate lock of a motor vehicle, are provided with sensors for ascertaining the state of the lock and transmitting this information to a controller, problems can arise owing to false lock signals, and this can affect e.g. the theft warning system or the function of the tail lamps.

In the case of many vehicles, tailgates are already provided with actuators, in order to be able to open or close them by a motor or with the assistance of a motor. As a result, actuation of an actuating element, for example a pressure switch, can make the opening or closing operation start and stop. It is also possible to make certain adjustments, such as a maximum opening angle, by virtue of a certain actuation code. Such an actuating element can be provided in the vehicle, for example in the region of the center console or alternatively or additionally in a portable operating element, such as the vehicle key, which can also have a remote unlocking function.

DE 10 2017 214 381 B3 describes a securing system for securing a load to a vehicle, which comprises a drive device for moving a tailgate of the vehicle from an open position to a closed position via an intermediate position, a detection unit for detecting the closing of a tailgate lock of the tailgate in the intermediate position, and an arresting device for arresting the tailgate when closing is detected in the intermediate position, in order to prevent further movement of the tailgate when the vehicle is being driven, with the result that a load is secured in a luggage compartment of the vehicle by virtue of the arresting means. "Securing a load" can be understood in this respect to mean that a load is transported in the luggage compartment of the vehicle, in particular with an overhanging length, with the result that the tailgate cannot be closed in the completely closed position. In this respect, to secure a load, the tailgate can be arrested, with the result that the tailgate no longer moves and therefore cannot damage the load. In the narrowest sense, "securing a load" is also to be understood in this respect as meaning that the tailgate can additionally fix the load, in order for example to prevent the load from falling out.

In this case, the arresting device may comprise an arresting element, which is electrically connected to at least one electric drive unit of the drive device, in order to short circuit the drive unit for arresting purposes. For example, the drive unit may be in the form of a tailgate drive, preferably an electric motor or the like. Correspondingly, short-circuiting of the drive unit can result in a very high braking force, which offers secure fixing of the tailgate even in the event of high disturbing forces.

DE 11 2017 005 421 T5 discloses a system for preventing undesired movements of a closure element of a vehicle, comprising means for determining the locking of the closure element, comprising means for determining the driving state of the vehicle, and comprising control means for controlling slowing-down means, in order to prevent the unlocked closure element of the vehicle from moving, as a response to establishing that the closure element of the vehicle is unlocked. The slowing-down means may be braking means, which can be any suitable means that prevent a closure element of the vehicle from moving. The braking means can for example include any suitable means or brakes or brake mechanisms that apply force to a bar of the closure element of the vehicle in order to prevent a movement of the closure element of the vehicle. The braking means may be formed with a motor for a strut bar of the closure element of the vehicle, which can be short-circuited.

An object of the invention is therefore to specify an inexpensive solution which is as straightforward as possible for securing a tailgate with a lock which cannot be latched in place.

The object is achieved by a method as claimed in claim 1. Advantageous developments are specified in the dependent claims.

Accordingly, in the case of a method for operating a motor-actuatable tailgate of a motor vehicle, the motor of which can be activated or deactivated controlledly by actuation of an actuating element of an operating element, a control unit ascertains whether the actuating element is actuated for a predetermined period of time or by a predetermined actuation sequence and at the same time a manual closing movement of the tailgate is effected, and if so, a holding mode is activated on reaching the tailgate position at which the actuating element is no longer actuated, wherein the motor is short-circuited in the holding mode.

A short circuit of the power supply lines of the motor makes it possible to brake the manual movement of a tailgate with electric actuators, for example at least one motor, since the motor or the motors is or are then operated in generator mode. This makes securing of the tailgate unnecessary and therefore removes the problems and risks associated with the lock, while customer convenience can be increased.

In one configuration of the method, the predetermined period of time lasts longer than 4 seconds. The predetermined actuation sequence can be realized by repeatedly and successively actuating the actuating element. It may be provided here, for example, that the actuating element needs to be pressed three times in succession in order to trigger the method.

In one advantageous configuration of the method, it may be provided that the control unit transmits a signal to a display and/or generates an acoustic signal when the holding mode is activated. As a result, a user is informed about this state if they have not deliberately triggered it, or in the form of information that the holding mode was actually activated.

In a refinement of the method, if the motor of the motor vehicle is switched on, in the event of engagement of a driving stage combined with the tailgate being open and not closed, the control unit can transmit a signal to a display which displays the option of triggering the holding mode.

This advantageously makes a vehicle driver aware that the tailgate is open and gives them the option of fixing this by means of the holding mode.

The holding mode can be ended by a motorized movement of the tailgate started by actuation of the actuating element.

A tip-to-run function is thus temporarily deactivated during a steady or pulsed actuation of the inner or outer pushbutton for motorized operation of a tailgate. It is thus possible for example in the event of an actuation of longer than 4 seconds or pressing at least three times and identification of a manual closing movement for the holding mode to be activated in opposition to the known function of "programming a customer-specific upper end position", instead of learning a new end position. The user or driver can thus press the pushbutton and keep it pressed and move the tailgate for the duration of the press. When both conditions are met, the holding mode is activated at the position at which the pushbutton is released again.

A tip-to-run function is to be understood to mean a starting of a motorized movement by triggering a manual tailgate movement, and the tip-to-run function should thus be deactivated during the method.

The user can be informed about the activation of the holding mode by communication in the man-machine interface, referred to as MMI below, or acoustically. In addition, the MMI gives the user the option of activating the function via the MMI when the vehicle is being prepared for driving (motor switched on, engagement of the driving stage combined with the tailgate being open and not closed).

An activated holding mode deactivates the tip-to-run function. An electrical movement started by pressing on a pushbutton ends the mode.

If a movement of the tailgate in the opening direction is detected while the vehicle is parked and the holding mode is activated, a warning signal is transmitted, for example via the vehicle lamp, horn or siren. If a movement in the opening direction (caused e.g. by jolting) is detected while the vehicle is being driven, a restricted force and low speed are used—for a limited period of time—to return to the original holding position.

The invention claimed is:

1. A method for operating a motor-actuatable tailgate of a motor vehicle, a motor of which can be activated or deactivated controlledly by actuation of an actuating element of an operating element, comprising:

upon a control unit ascertaining the actuating element being actuated for a predetermined period of time or a predetermined actuation sequence and contemporaneously a manual closing movement of the tailgate being effected, activating a holding mode on reaching a tailgate position at which the actuating element is no longer actuated, wherein power supply lines to the motor are short-circuited in the holding mode to brake the manual movement of the tailgate by operating the motor in a generator mode to hold the tailgate position without application of power.

2. The method as claimed in claim 1, wherein the predetermined period of time is longer than 4 seconds.

3. The method as claimed in claim 1, wherein the predetermined actuation sequence is realized by repeatedly and successively actuating the actuating element.

4. The method as claimed in claim 1, wherein the control unit transmits a signal to a display and/or generates an acoustic signal when the holding mode is activated.

5. The method as claimed in claim 1, wherein, upon the motor of the motor vehicle being switched on, in an event of engagement of a driving stage combined with the tailgate being open and not closed, the control unit transmits a signal to a display which displays an option of triggering the holding mode.

6. The method as claimed in claim 1, wherein the holding mode is ended by a motorized movement of the tailgate started by actuation of the actuating element.

7. The method as claimed in claim 1, wherein, upon a movement of the tailgate in an opening direction being detected while the vehicle is parked and the holding mode is active, a warning signal is transmitted.

8. The method as claimed in claim 1, wherein, upon a movement in an opening direction being detected while the vehicle is being driven, the motor is driven with restricted force and low speed moving the tailgate back to an original holding position.

9. The method as claimed in claim 4, wherein, upon the motor of the motor vehicle being switched on, in an event of engagement of a driving stage combined with the tailgate being open and not closed, the control unit transmits a signal to a display which displays an option of triggering the holding mode;

wherein the holding mode is ended by a motorized movement of the tailgate started by actuation of the actuating element;

wherein, upon a movement of the tailgate in an opening direction being detected while the vehicle is parked and the holding mode is active, a warning signal is transmitted; and wherein, upon a movement in an opening direction being detected while the vehicle is being driven, the motor is driven with restricted force and low speed moving the tailgate back to an original holding position.

10. The method as claimed in claim 2, in which the control unit transmits a signal to a display and/or generates an acoustic signal when the holding mode is activated.

11. The method as claimed in claim 2, wherein, upon the motor of the motor vehicle being switched on, in an event of engagement of a driving stage combined with the tailgate being open and not closed, the control unit transmits a signal to a display which displays an option of triggering the holding mode.

12. The method as claimed in claim 2, wherein the holding mode is ended by a motorized movement of the tailgate started by actuation of the actuating element.

13. The method as claimed in claim 2, wherein, upon a movement of the tailgate in an opening direction being detected while the vehicle is parked and the holding mode is active, a warning signal is transmitted.

14. The method as claimed in claim 2, wherein, upon a movement in an opening direction being detected while the vehicle is being driven, the motor is driven with restricted force and low speed moving the tailgate back to an original holding position.

15. The method as claimed in claim 10, wherein, upon the motor of the motor vehicle being switched on, in an event of engagement of a driving stage combined with the tailgate being open and not closed, the control unit transmits a signal to a display which displays an option of triggering the holding mode;

wherein the holding mode is ended by a motorized movement of the tailgate started by actuation of the actuating element;

wherein, upon a movement of the tailgate in an opening direction being detected while the vehicle is parked and the holding mode is active, a warning signal is transmitted; and wherein, upon a movement in an opening direction being detected while the vehicle is being driven, the motor is driven with restricted force and low speed moving the tailgate back to an original holding position.

16. The method as claimed in claim 3, in which the control unit transmits a signal to a display and/or generates an acoustic signal when the holding mode is activated.

17. The method as claimed in claim 3, wherein, upon the motor of the motor vehicle being switched on, in an event of engagement of a driving stage combined with the tailgate being open and not closed, the control unit transmits a signal to a display which displays an option of triggering the holding mode.

18. The method as claimed in claim 3, wherein the holding mode is ended by a motorized movement of the tailgate started by actuation of the actuating element.

19. The method as claimed in claim 3, wherein, upon a movement of the tailgate in an opening direction being detected while the vehicle is parked and the holding mode is active, a warning signal is transmitted.

20. The method as claimed in claim 16, wherein, upon the motor of the motor vehicle being switched on, in an event of engagement of a driving stage combined with the tailgate being open and not closed, the control unit transmits a signal to a display which displays an option of triggering the holding mode;

wherein the holding mode is ended by a motorized movement of the tailgate started by actuation of the actuating element;

wherein, upon a movement of the tailgate in an opening direction being detected while the vehicle is parked and the holding mode is active, a warning signal is transmitted; and wherein, upon a movement in an opening direction being detected while the vehicle is being driven, the motor is driven with restricted force and low speed moving the tailgate back to an original holding position.

* * * * *